United States Patent [19]
Rogers

[11] Patent Number: 5,633,510
[45] Date of Patent: May 27, 1997

[54] STORAGE PHOSPHOR READER CALIBRATION TECHNIQUE

[75] Inventor: Michael K. Rogers, Mendon, N.Y.

[73] Assignee: Eastman Kodak Company, Rochester, N.Y.

[21] Appl. No.: 559,973

[22] Filed: Nov. 17, 1995

[51] Int. Cl.⁶ .................................................. G03B 42/02
[52] U.S. Cl. .......................... 250/587; 250/582; 250/584; 250/586
[58] Field of Search .................... 250/587, 586, 250/584, 582

[56] References Cited

U.S. PATENT DOCUMENTS

| | | |
|---|---|---|
| Re. 31,847 | 3/1985 | Luckey . |
| 5,086,228 | 2/1992 | Kojima .................................. 250/587 |
| 5,404,024 | 4/1995 | Namiki .................................. 250/586 |
| 5,420,441 | 5/1995 | Newman et al. ..................... 250/581 |

*Primary Examiner*—Constantine Hannaher
*Attorney, Agent, or Firm*—William F. Noval

[57] ABSTRACT

A calibration technique for a storage phosphor reader which calibrates the storage phosphor reader to the exposure value of the x-ray source measured at the time that the storage phosphor to be read is exposed.

4 Claims, 8 Drawing Sheets

STORAGE PHOSPHOR READER CALIBRATION TECHNIQUE

FIELD OF THE INVENTION

This invention relates in general to storage phosphor imaging systems and relates more particularly to a calibration technique for a storage phosphor reader.

BACKGROUND OF THE INVENTION

U.S. Patent Re. 31,847, reissued Mar. 12, 1985, inventor Luckey, discloses a storage phosphor system in which a storage phosphor is exposed to an x-ray image of an object, such as the body part of a patient, to record a latent x-ray image in the storage phosphor. The latent x-ray image is read out by stimulating the storage phosphor with relatively long wavelength stimulating radiation such as red or infrared light produced by a gas or diode laser. Upon stimulation, the storage phosphor releases emitted radiation of an intermediate wavelength, such as blue light, in proportion to the quantity of x-rays that were received. To produce a signal useful in electronic image processing, the storage phosphor is scanned in a raster pattern by a laser beam deflected by an oscillating or rotating scanning mirror or by a rotating hologon. The emitted radiation from the storage phosphor is reflected by a mirror light collector and detected by one or more light detectors to produce an x-ray image signal. Typically, the storage phosphor is translated in a page or slow scan direction past the laser beam which is repeatedly deflected in a line or fast scan direction perpendicular to the page or slow scan motion of the storage phosphor to form an image signal having a matrix of pixels. The x-ray image signal can then be viewed as a visual image produced on a video monitor or other display device or as a permanent image printed out on film or paper.

In storage phosphor readers it is desirable to provide high emitted light collection efficiency in order to speed up the reading of a storage phosphor and to attain maximum reader performance. There has been proposed a storage phosphor reader having a highly efficient emitted light collector system including an array of five photodetectors (photomultiplier tubes) which receive light either directly emitted from a storage phosphor or reflected by a highly efficient specularly reflective mirror light collector. In such a storage phosphor reader, there is a need to verify that the reader is calibrated to the exposure value of the x-ray source so that the image signal read from the storage phosphor is accurate.

SUMMARY OF THE INVENTION

According to the present invention, there is provided a calibration technique for storage phosphor readers which fulfills the need discussed above. According to a feature of the present invention, there is provided a calibration technique for a storage phosphor reader which calibrates the storage phosphor reader to the exposure value of the x-ray source measured at the time that the storage phosphor to be read is exposed.

According to a further feature of the present invention there is provided in a storage phosphor reader including a source of a beam of stimulating light, a scanner for repetitively scanning said beam of stimulating light in a line scan direction across a storage phosphor moved in a page scanning direction past said beam of light, and a plurality of photodetectors arrayed in a line scanning direction for converting light emitted by a scanned storage phosphor into an electrical image signal, the method of calibrating said storage phosphor reader comprising the steps of:

exposing a storage phosphor to a uniform field of x-ray radiation;

measuring the exposure value of said uniform field of x-ray radiation at the time of said exposing said storage phosphor with a transportable x-ray radiation measuring device which includes a phosphor for converting said x-ray radiation into a light signal, wherein said phosphor has a responsivity curve which is similar to the responsivity curve of said storage phosphor;

moving said storage phosphor in a page scan direction past said line scanning beam of stimulating light to produce an emitted light signal; and calibrating the signal channel of each of said plurality of photodetectors as a function of said measured x-ray radiation signal so that the image signal read from said storage phosphor by said plurality of photodetectors is accurate.

DESCRIPTION OF THE EMBODIMENTS

Figure 1:
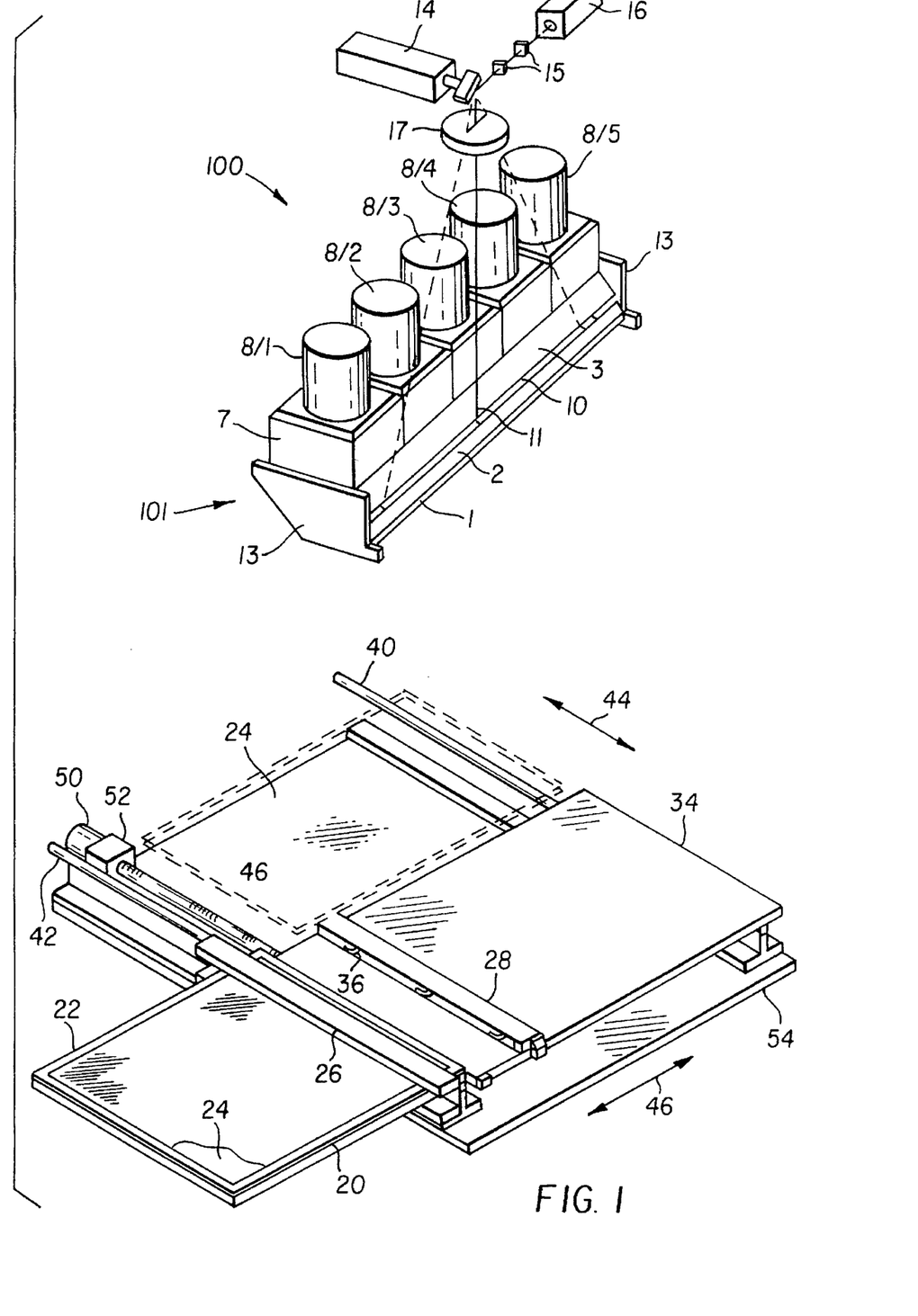
FIG. 1 is a perspective view of a storage phosphor reader in which the calibration technique of the present invention may be used.

Referring now to FIG. 1 there is shown the functional components of a storage phosphor reader which can incorporate the calibration procedure of the present invention. As shown, storage phosphor reader 100 includes a laser source 16, such as a gas or diode laser, which produces a laser beam which is shaped by beam shaping optics 15. The laser beam is then caused to be scanned in a fast or line scan direction by oscillating galvo mirror 14 onto storage phosphor plate 24, after the laser beam has passed through F-theta lens 17. The scanning laser beam then passes into the emitted light collector 101 through a first slit aperture 10 which lies between specularly reflective mirrors 2 and 3, and immediately exits collector 101 through a second slit aperture (not shown) aligned with first slit aperture 10. The laser beam is brought to focus on the storage phosphor 24 creating emitted light from a very small pixel area on the storage phosphor 24. The laser beam is scanned across storage phosphor 24 in a line scan direction as it is moved in a slow or page scan direction 44 perpendicular to the line scan direction.

The emitted light from storage phosphor 24 is directed either directly or indirectly through reflection from mirrors 1, 2, and 3 and two other mirrors not shown through the stimulating light absorption filter 7 to an array of five photodetector photomultiplier tubes (PMTs) 8. The PMTs 8 are, for example, five 3 by 3 inch square photomultiplier tubes supplied by the Burle or Hammamatsu companies.

A storage phosphor cassette 22 containing storage phosphor plate 24 is loaded on cassette loading platform 20. The cassette 22 is clamped in place by load lever 26. Storage phosphor plate 24 is extracted from cassette 22 by extraction device 28. Extraction device 28 is slidably mounted on translation stage 34 and includes hooks 36 which engage storage phosphor plate 24 to move it onto stage 34.

Translation stage 34 is slidably mounted on rails 40 and 42 for movement in direction 44 (slow or page scan direction). Direction 44 is perpendicular to the directions 46 of loading and unloading plate 24. Stage 34 is driven by a screw drive mechanism 48 actuated by or servo stepper motor 50 mounted on block 52. Rails 40 and 42 are supported by frame member 54 of reader 100.

Once a storage phosphor plate 24 is on translation stage 34 a scan is begun. Translation stage 34 is moved in the direction of arrow 44 (to the left) and galvo 14 scans the laser beam repetitively in the line scan direction for the appropriate number of line scans as determined by the plate size. The stage 34 is then reversed to bring plate 24 back to the starting position. Any residual image on plate 24 is then erased, and plate 24 is returned to cassette 22 by mechanism 28.

Figure 2:
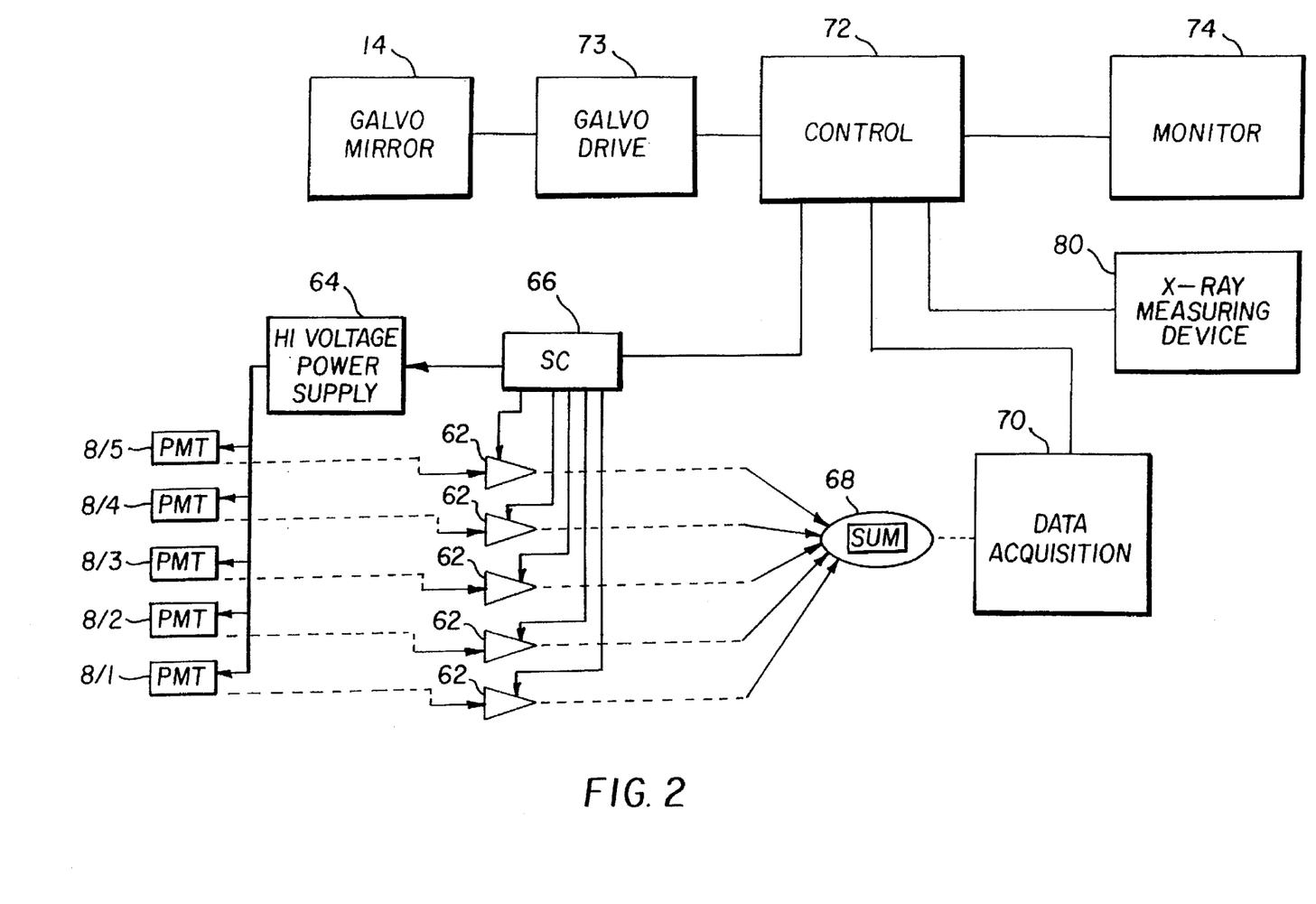
FIG. 2 is a block and diagrammatic view of a control and operation calibration for the reader of FIG. 1.

Referring to FIG. 2, there is shown operation and control circuit 60 for reader 100. During the scan of storage phosphor plate 24, the emitted light is converted by PMTs 8 to electrical currents which are converted to voltages by preamplifiers 62. PMTs 8 are supplied high voltages by high voltage power supply 64 which, for example, can supply 0–1000 volts. The gain (e.g., 0–2×) of preamplifiers 62 is controlled by control signals from servo and sequence control circuit 66. The voltage outputs from preamplifiers 62 are summed in sum circuit 68. The output analog voltage from sum circuit 68 is converted to a digital signal in data acquisition circuit 70. The digital signal is supplied to control 72. A touch screen monitor 74 serves to display the x-ray image signal from control circuit 72 and to receive touch actuated control commands and data from an operator. Control 72 also controls the operation of galvo 14, through galvo drive circuit 73.

According to the invention, a transportable x-ray radiation measuring device 80 (FIG. 2) is provided to measure the x-ray exposure value at the time of the exposure of storage phosphor 24. The measured exposure value is in millirads (mr) which can be converted to an exposure index number to be used for image processing and by hospital personnel to track x-ray exposures for specific image needs. The exposure latitude of the storage phosphor reader 100 is, for example, 0.01 to 100 mr or 0 to 4000 code values of the output digital image signal. As will be explained in greater detail later, the exposure value is used to verify/set a given code value of reader 100 to the measured millirads.

As discussed above, there is provided a procedure for the calibration of reader 100 to establish the image collection parameters of the reader (i.e., to establish parameters that will yield a square pixel when storage phosphor plates are scanned). In general, the procedure accomplishes the following:

a) finds the leading edge of storage phosphor plate 24;

b) finds the front and rear edges of plate 24, by adjusting the offset and amplitude of the galvo mirror, thus fitting the line scan of the laser beam to the dimension of plate 24;

c) verifies that the PMTs 8 are functioning;

d) adjusts the gain of the signal channel of each PMT 8 to an appropriate gain value; and e) generates a collector profile correction signal to assure uniformity of the signal across the line scan.

Each of these steps will now be discussed in greater detail. A storage phosphor plate 24 of a given size is first exposed to a uniform x-ray exposure. (The calibration procedure must be performed for each size plate to be used.) The flat field exposure for an exemplary reader, must be between 10–30 units of dose per plate based on an internal dosimeter reading (this exposure value is used also to set the PMT high voltage gain). The uniformly exposed plate 24 is then loaded into reader 100.

Initially, the galvo mirror 14 is set to overscan the plate 24. This ensures that the leading (top edge of the plate 24 when moving in the slow scan direction 44), front ("left"), and rear ("right") edges will be found. The offset or starting point of the galvo is set to a low value and the amplitude or angle of scan of the galvo is set to a high value so that the pixel shape will be rectangular. Throughout this process, the number of pixels to be scanned in a line direction remains fixed (e.g., 2048 pixels).

The first step of the calibration procedure is to find the leading edge of plate 24. Plate 24 is scanned by the laser beam. The resulting signal value for a selected set of pixels is tested to determine when their average exceeds a predetermined value (e.g., 2000 code values). This is illustrated in region 1 of FIG. 3 and in the graphical diagram of signal value vs. line scan pixel position shown in FIG. 4. When the average has exceeded the predetermined value, the leading edge of the plate 24 has been found.

If the average code values for all the PMTs are between 100 and 1500 cv, for example, then the plate has a low exposure. If the code values are below 100, then the plate 24 was not exposed or the high voltage was not connected to PMTs 8.

Figure 4:
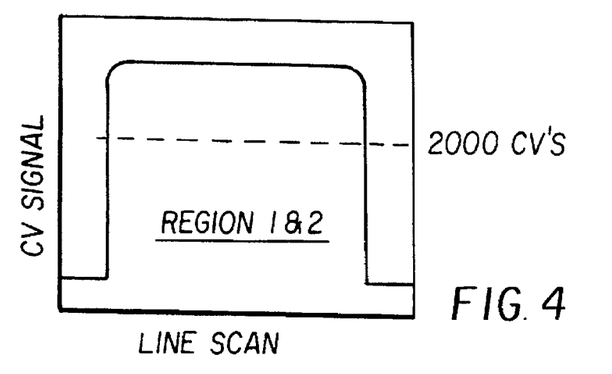
FIGS. 4–15 are graphical views useful in explaining the present invention.
Figure 5:
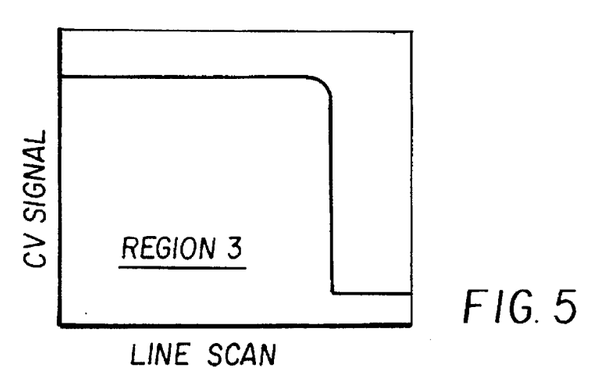
Figure 6:
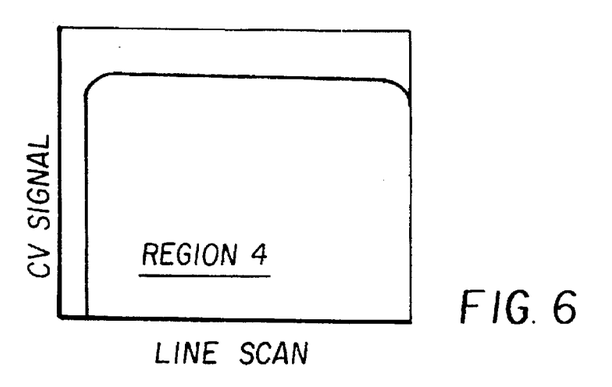

The next step of the calibration procedure is to find the front and rear edges of the plate 24 by adjusting the amplitude and offset of galvo mirror 14. As shown in region 2 of FIG. 3 and in FIG. 4, plate 24 is continually overscanned in the fast or line scan direction. The galvo mirror offset is gradually increased (i.e., the galvo mirror 14 starting position is adjusted so that the laser beam starts at a higher position on plate 24) until there is no drop off in code values of the image signal (below 2000 cv), thus indicating that the front edge is found. (See FIG. 5 and region 3 of FIG. 3). The offset of galvo mirror 14 is now set at the front edge and the amplitude is decreased until the rear edge is found (again, this is determined by no drop off in code values). This is illustrated in region 4 of FIG. 3 and in FIG. 6. By decreasing the amplitude the velocity is also decreased which widens the pixels to an appropriate shape (i.e., the aspect ratio is preserved at less than or equal to 1%).

Figures 16, 17:
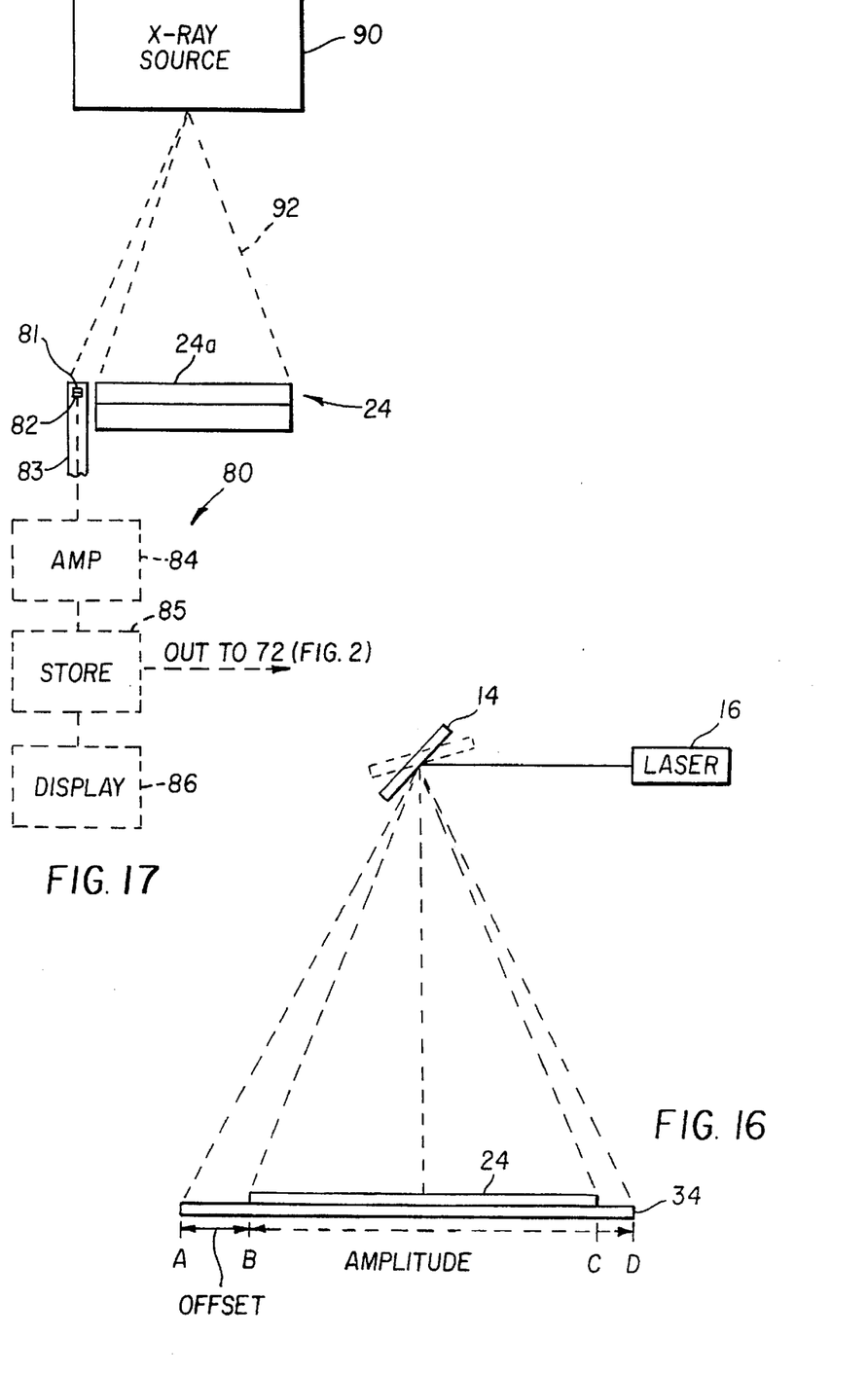
FIG. 16 is a diagrammatic view useful in explaining the present invention.
FIG. 17 is a partially block, partially diagrammatic view of an x-ray measuring device useful in explaining the present invention.

This step is further illustrated in FIG. 16. As shown, the beam from laser 16 is scanned by galvo mirror 14 onto storage phosphor plate 24. During the operation to find the front edge B of plate 24 the offset of mirror 14 is moved so that the laser beam is moved from point A to point B. The rotation of mirror 14 is then set so that each scan starts at point B. During the operation to find the rear edge C of plate 24, the amplitude of mirror 14 is decreased so that the laser beam is moved from point D to point C. The mirror 14 is then set so that each scan ends at point C.

The third step of the calibration procedure is to verify that PMTs 8 are functioning. Initially, PMTs 8 are set up as if no collector profile correction signal has been determined. Thus, the PMT high voltage is set, e.g., to −500 volts and each PMT 8 signal channel has its gain set to the highest possible setting for that particular plate size.

Figure 3:
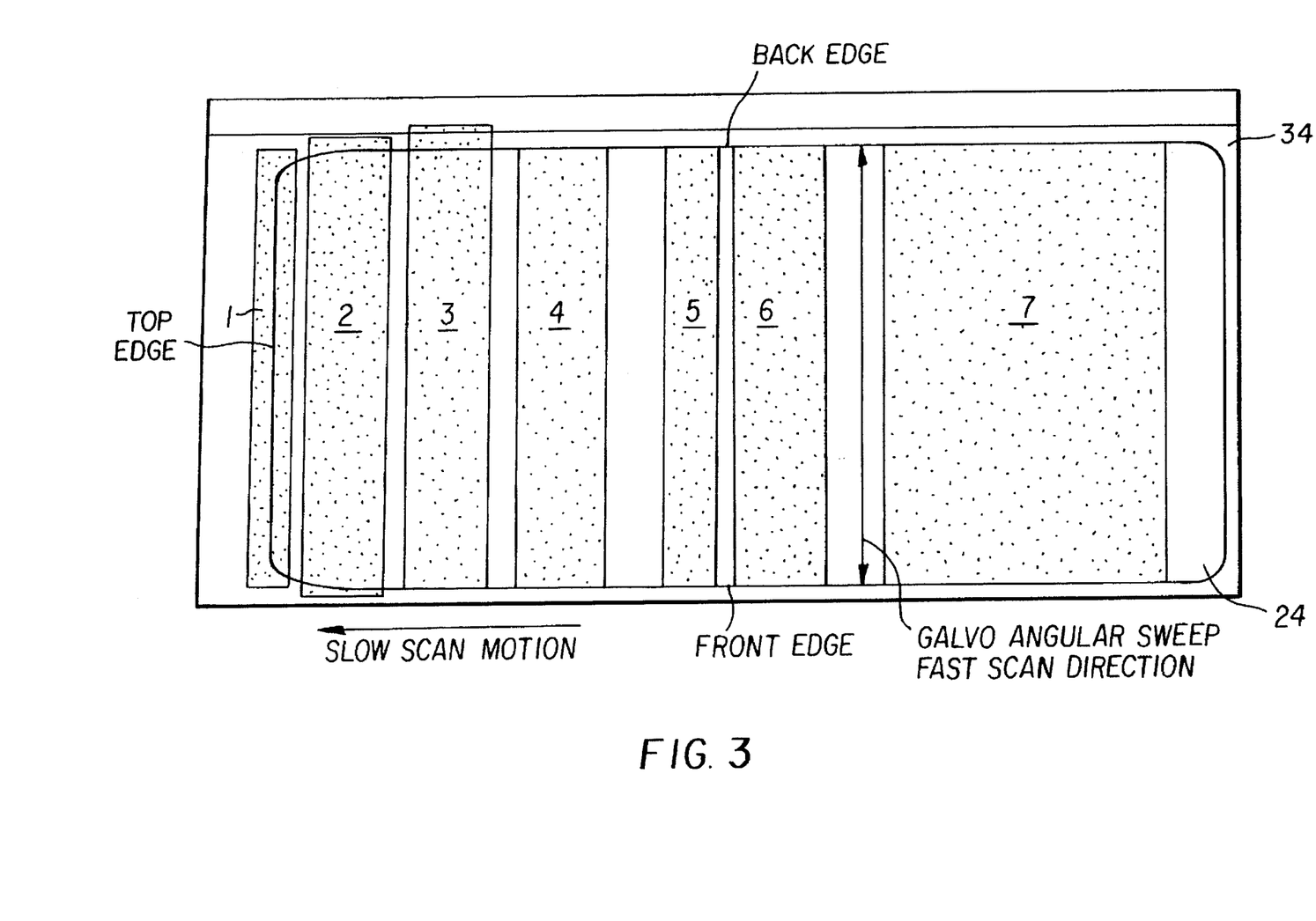
FIG. 3 is a diagrammatic view useful in illustrating the calibration technique of the present invention.
Figure 7:
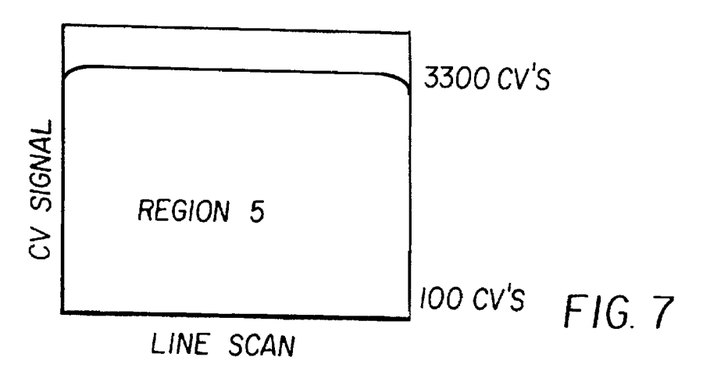
Figure 8:
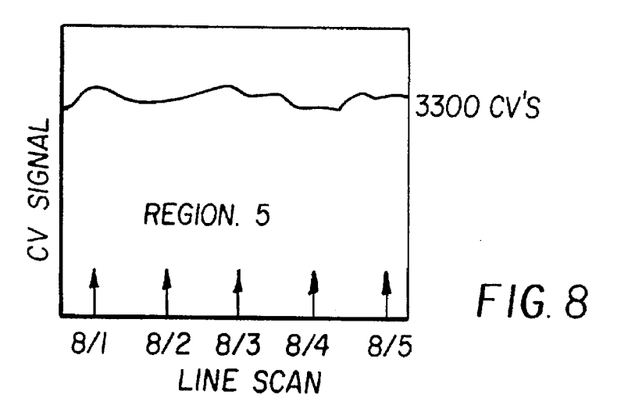
Figure 9:
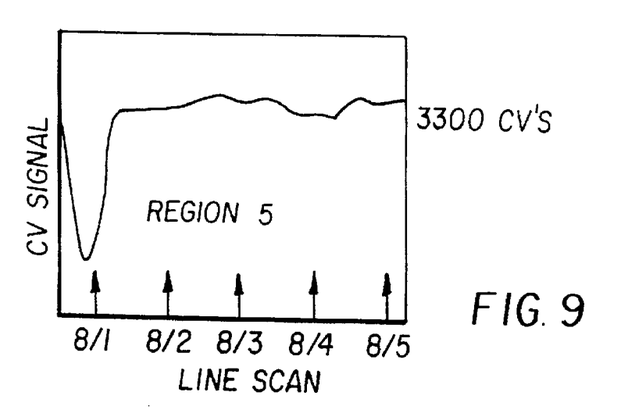
Figure 10:
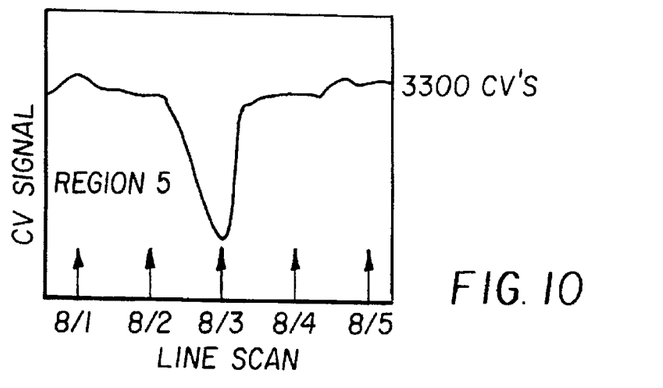
Figure 11:
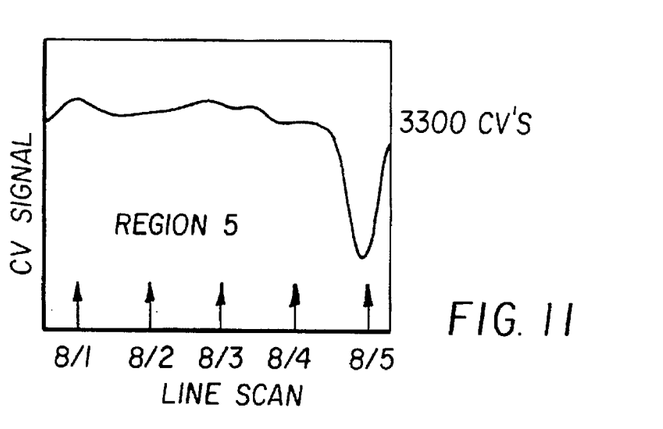

Each PMT 8 is tested to determine whether it is operating. Start with all five PMTs on and take a baseline reading. The gain for each PMT signal channel is set at 1×. (See; FIG. 3, region 5, FIGS. 7 and 8.) PMT 8/1 is turned off by setting the channel gain to 0 and the output signal is checked to determine if there is a drop in signal code value under PMT 8/1. If no drop occurs, the PMT 8/1 channel is not working. If, as shown in FIG. 9, there is a drop in signal code value, then the PMT is assumed to be functioning properly. The procedure is repeated for the other four PMTs 8/2–8/5. (See: FIGS. 10 and 11 illustrating the cases where PMT 8/3 and PMT 8/5, respectively, are determined to be functioning.)

Figure 12:
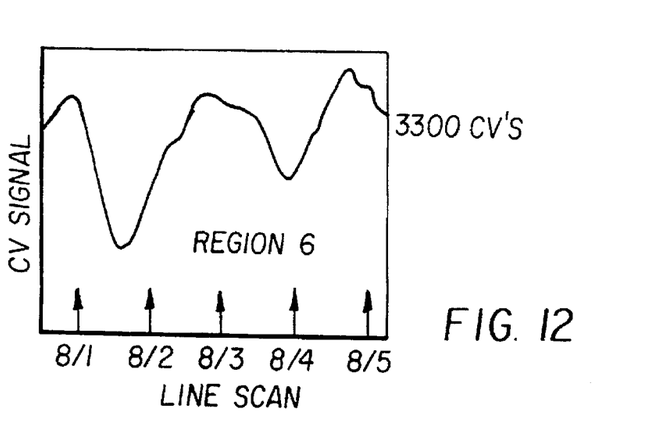
Figure 13:
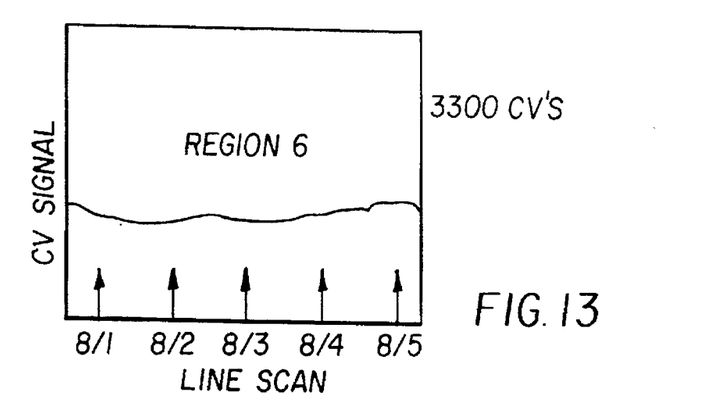

The next step of the calibration procedure is to adjust each PMT 8 signal channel to the appropriate gain. (See: FIG. 3, region 6, FIGS. 12–14.) With all of the PMT 8 channel gains set to 1×, the fast scan slice is checked for the lowest amplitude reading. As shown in FIG. 12, for this example, PMT 8/2 channel has the lowest reading. The other PMT 8 channel gains are now lowered by adjusting the gain of the respective preamplifier 62 (FIG. 2) to even out the peaks to within 10 code values (FIG. 13).

Figure 14:
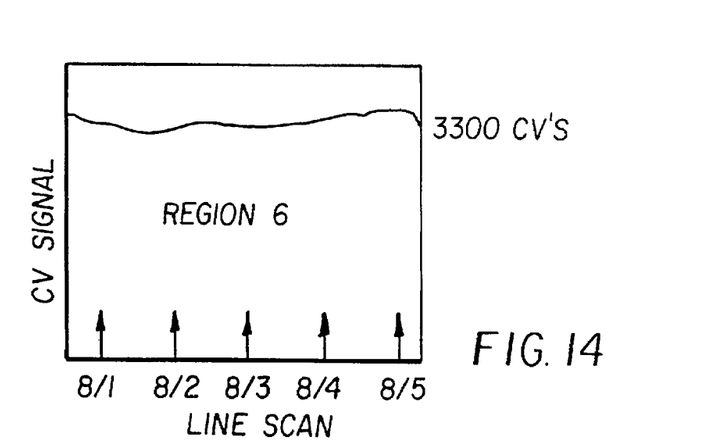
Figure 15:
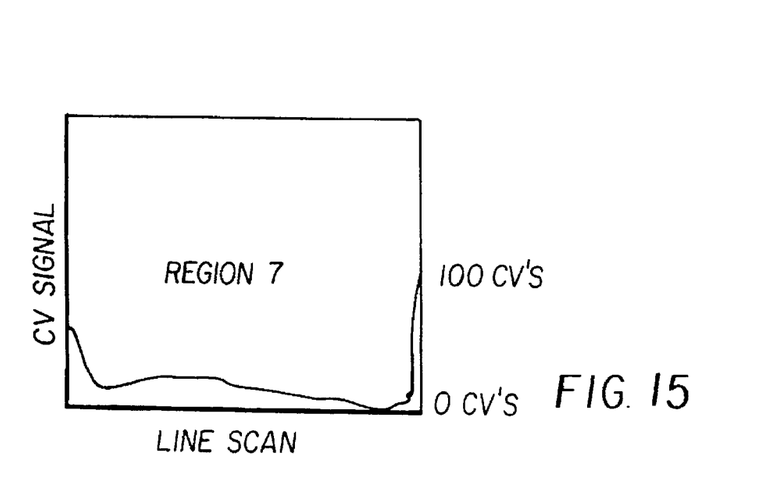

According to the present invention, the exposure value of x-ray radiation at the time of exposure of storage phosphor plate 24 is used to calibrate the high voltage of each PMT 8. The PMT High Voltage reference voltage is adjusted up for each PMT 8 (FIG. 2, HV Power Supply 64) to calibrate it to the known exposure setting (See: FIG. 14). For example, 20.2 units of x-ray dose read from the x-ray radiation measuring device 80=3305 code values.

The use of device 80 will now be explained in greater detail. As shown in FIG. 17, device 80 includes a sensor probe 83 having a phosphor 81 for converting x-ray radiation into light and photodetector 82 for converting light into an electrical image signal. The phosphor 81 has a responsivity curve similar to the storage phosphor 24a of storage phosphor plate 24. The signal from photodetector 82 is amplified by amplifier 84 and stored in store 85. This signal can be displayed on display 86 or outputted to control 72. The 0–200 millivolt (mv) output of device 80 is equal to 0–200 millirads x-ray energy. The components of device 80 are contained in a hand held casing that can be transported from the x-ray source 90 to the reader 100 so that a measured reading may be entered thereinto. Alternatively, storage phosphor cassette 22 can have an x-ray detector built in. The x-ray detector would store the x-ray dosage at the time of the exposure. The dosage would be read in when the cassette is unloaded/scanned to determine the exposure index. This could then be used to self calibrate reader 100.

As shown in FIG. 17, the X-ray source 90 produces an x-ray beam 92 which uniformly irradiates storage phosphor plate 24 and measuring device 80. The x-ray source 90 can for example have the following operating parameters: KvP range from below 60 KvP to above 100 KvP; current - 0–150 mA; seconds exposure 0.001–1 second; and mAs - 0.85–85 mAs at 83 KvP. A typical x-ray exposure is 83 KvP 150 mA, 0.0625 seconds, 9.4 mAs=3300 code values when measured by Reader 80.

The last step of the calibration procedure is to determine the fast scan or collector fine adjustment correction signal in order to counterbalance the peaks and valleys still remaining in the PMT 8 gains, thereby effectively eliminating the peaks. The residual signal is inverted and stored in memory as the collector profile correction signal. This correction signal will be added on to the output signal during the actual scan of a storage phosphor plate.

Although the invention has been described above with reference to specific embodiments, it will be understood that modifications and variations can be made within the scope of the invention. Thus, although five PMTs have been described, it will be understood that the calibration technique of the present invention is applicable to readers using more or less than five PMTs. Photodetectors other than PMTs can also be used.

What is claimed is:

1. In a storage phosphor reader including a source of a beam of stimulating light, a scanner for repetitively scanning said beam of stimulating light in a line scan direction across a storage phosphor moved in a page scanning direction past said beam of light, and a plurality of photodetectors arrayed in a line scanning direction for converting light emitted by a scanned storage phosphor into an electrical image signal, the method of calibrating said storage phosphor reader comprising the steps of:

exposing a storage phosphor to a uniform field of x-ray radiation;

measuring the exposure value of said uniform field of x-ray radiation at the time of said exposing said storage phosphor with a transportable x-ray radiation measuring device which includes a phosphor for converting said x-ray radiation into a light signal, wherein said phosphor has a responsivity curve which is similar to the responsivity curve of said storage phosphor;

moving said storage phosphor in a page scan direction past said line scanning beam of stimulating light to produce an emitted light signal;

calibrating the signal channel of each of said plurality of photodetectors as a function of said measured x-ray radiation signal so that the image signal read from said storage phosphor by said plurality of photodetectors is accurate: and measuring the signal produced by said plurality of photodetectors to determine the leading edge of the storage phosphor as taken in the page scan direction;

while overscanning the storage phosphor in a line scan direction, measuring the signal produced by said plurality of photodetectors to determine the front and rear edges of said storage phosphor and from said measurements, setting the start and end points of the oscillation of said mirror so that the traverse of said stimulating light on said storage phosphor begins at said front edge and ends at said rear edge;

thereafter, measuring the signal produced by each of said plurality of photodetectors to determine whether each is operating;

adjusting the signal channel of each of said plurality of photodetectors so that the signal produced by said plurality of photodetectors is substantially uniform across a line scan; and determining a collector profile correction signal to be added to each line scan of a storage phosphor read by said reader.

2. The method of claim 1 wherein in said measuring step said transportable x-ray radiation measuring device comprises a hand-held device.

3. The method of claim 1 wherein said storage phosphor which is exposed is contained in a cassette and wherein, in said measuring step, said transportable x-ray radiation measuring device is mounted on said cassette.

4. The method of claim 1 wherein said calibration step includes the steps of setting the gain of each photodetector signal channel to the same predetermined value, determining the lowest photodetector signal value, adjusting the gain of each of the other photodetector signal channels until the signal values of each said other channel is substantially equal to said determined lowest signal value, and adjusting the high voltage for each photodetector to calibrate it to the measured x-ray radiation exposure value to produce a substantially uniform line scan output signal which is calibrated to said measured x-ray radiation exposure value.

* * * * *